United States Patent Office 3,553,543
Patented Jan. 5, 1971

3,553,543
CONVOLUTELY WOUND CAPACITOR
Paul H. Netherwood, Williamstown, Mass., assignor to Sprague Electric Company, North Adams, Mass., a corporation of Massachusetts
Filed May 7, 1969, Ser. No. 822,510
Int. Cl. H01g 3/17
U.S. Cl. 317—258                 10 Claims

ABSTRACT OF THE DISCLOSURE

A convolutely wound capacitor has a comparatively nonmeltable dielectric film having a metallization layer in extended electrode fashion on opposite surfaces thereof. A comparatively meltable dielectric film is positioned against at least one metallization layer. The films are convolutely wound so that said comparatively meltable film separates the metallization layers. Applied-while-molten metal terminals are in contact with at least part of the extended region of each metallization layer. The comparatively nonmeltable dielectric is nonmeltable at temperatures which melt the meltable dielectric.

BACKGROUND OF THE INVENTION

This invention is concerned with convolutely wound electrical capacitors.

For some time the art has been aware of the fact that film dielectrics such as polypropylene can be employed in capacitors to yield units having extremely good volumetric efficiency with a considerable saving in cost. However, several drawbacks have prevented the art from obtaining a commercial unit of this type. One practical problem encountered is in metallizing a film such as polypropylene—it is a slow process. Another drawback is that a film capacitor employing only polypropylene is extremely difficult to impregnate with a dielectric fluid. Polyolefin films are comparatively impervious to liquid dielectrics and can be wound to an extremely tight degree. During the rolling of the capacitor, air pockets are trapped between the layers and it is difficult to impregnate the unit with a liquid dielectric so as to displace these pockets. As a result, corona starting voltage is markedly lower and the units would be subject to early breakdown and shortened life.

A further problem concerning the use of a metallized polyolefin film in a convolutely wound capacitor is that of making effective end contact to the electrodes. Contacts are commonly applied by spraying a molten metal against the ends of the capacitance section so as to pick up the extended electrodes. When a polyolefin film is employed, the heat tends to melt and cause shrinking of the polymer film and the result is a poor or ineffectual end-contact. This condition also leads to the shortening of adjacent oppositely poled electrodes. The art would profit greatly if it could employ this comparatively low melting type dielectric film and not be hampered by the foregoing problems.

It is an object of the present invention to present a convolutely wound film capacitor having an effective end contact thereto.

It is a further object of the present invention to present a convolutely wound capacitor which is easily impregnated with a fluid dielectric material. These and other objects of the present invention will become more apparent upon consideration of the following description of its exemplifications together with reference to the accompanying drawings in which:

FIG. 1 is a perspective view of a partially unrolled capacitance section according to this invention; and FIG. 2 is a greatly enlarged side, sectional view of some of the successive layers of FIG. 1, showing the composite makeup of the layers in the capacitor of this invention.

SUMMARY OF THE INVENTION

Accordingly, the present invention is directed to a convolutely wound capacitor comprising in combination a comparatively nonmeltable dielectric film having a metallization layer in extended electrode fashion on opposite surfaces thereof so as to leave an unmetallized margin also on opposite surfaces thereof. A comparatively meltable dielectric film is positioned against at least one metallization layer. These two films are convolutely wound so that the comparatively meltable film separates the metallization layers. Applied-while-molten metal terminals are in contact with at least part of the extended region of each metallization layer. The comparatively nonmeltable dielectric is nonmeltable at temperatures which melt the meltable dielectric. In a more limited embodiment of the present invention the comparatively nonmeltable dielectric film is a porous film and the comparatively meltable dielectric film is a polyolefin film.

In a further embodiment of the present invention, the convolutely wound capacitor is impregnated with a dielectric material which is fluid at least at the time of impregnation.

DETAILED DESCRIPTION OF THE INVENTION

The following is one specific example of a capacitor according to the present invention.

Example

A 0.5 mil kraft paper film, approximately 2 inches wide, is metallized on both sides by a conventional vapor deposit technique. The metal applied is zinc and a single ⅛ inch unmetallized margin is provided on each side of the paper so that the metal layers are offset in conventional extended electrode fashion. The metallization layers have a resistivity of about 4–12 ohms/square. The metallized paper is electrically cleared by conventional techniques in order to locally vaporize the metal from any shorted regions. A 0.25 mil polypropylene film approximately 1¹⁵⁄₁₆ inches wide is placed against the metallized paper so that each edge of the polypropylene film is spaced approximately the same distance from the edges of the kraft paper. In other words the polypropylene film and the kraft paper have a common longitudinal center line. This combination is convolutely wound to form a capacitor section of approximately 5 microfarads. Each end of the capacitor roll is sprayed with molten zinc to form a contact to the oppositely poled extended electrodes.

Figure 1:
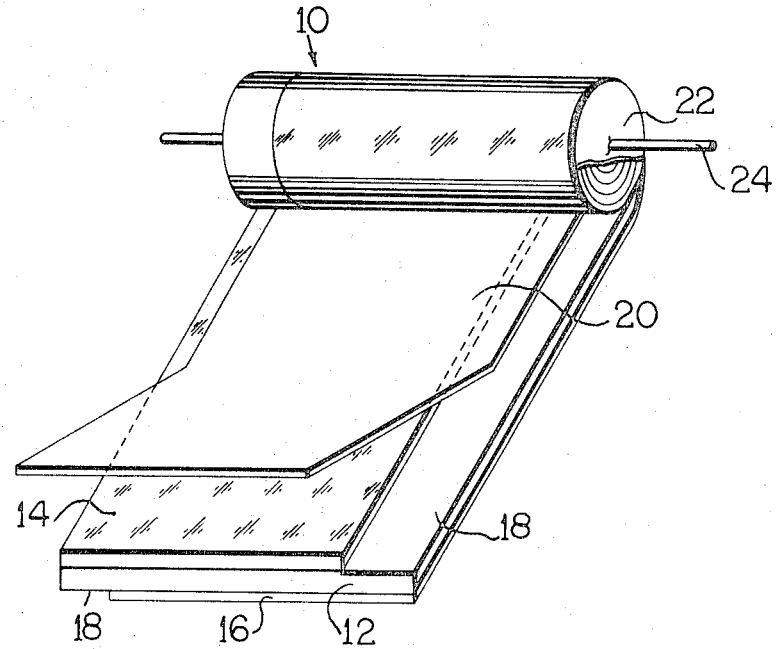
FIG. 1 shows a convolutely wound capacitance section 10 of the present invention having a comparatively nonmeltable dielectric film 12 having metallization layers 14 and 16 located on opposite surfaces thereof. The metallization layers are applied to film 12 in extended electrode fashion, that is, there is an unmetallized margin 18 on opposite sides of film 12. Separating metallization layer 16 from metallization layer 14 when the capacitor is in its convolutely rolled state is a comparatively meltable film 20. Shown partially cut away is electrode contact metal 22. Capacitor leads 24 are affixed to contact material 22.
Figure 2:
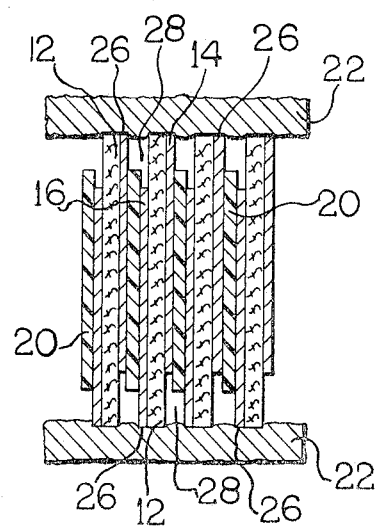
In FIG. 2 metal terminals 22 are shown making effective contact to oppositely poled electrodes 14 and 16 at regions 26. Regions 28 illustrate that metal terminal material 22 does not short out adjacent electrodes.

Electrical testing and visual examination of the end contact region of the capacitor revealed excellent continuous contact between metal mass 22 and the oppositely poled electrodes as shown in FIG. 2 of the drawing.

Equivalent units formed by employing double metallized polypropylene film, employing a polypropylene film spacer to separate electrodes when the unit is convolutely wound, have shown on electrical testing and visual inspection that the end contact to the oppositely poled electrodes was erratic, discontinuous and weak. Visual inspection showed that the polypropylene at the end region of the roll tended to melt and recede inwardly from the end of the roll, moving the metallization layers away from the metal end contacts.

In a modification of the specific example of the present invention, the zinc end spray was applied so as to leave an impregnation path into the capacitance section. Units of this type were then vacuum impregnated with mineral oil. Electrical testing and visual inspection revealed that the mineral oil completely impregnated the unit using as the entry path the impregnation space provided in the metal end spray and employing the wicking action of the kraft paper for access into the interior of the unit. This means provided effective displacement of all the air trapped into the unit during rolling.

By way of comparison the all-polypropylene unit, employing this material as both the dielectric and the spacer, followed by impregnation with mineral oil revealed that there was insufficient impregnation into the center regions of the capacitor.

In accordance with the present invention the comparatively nonmeltable dielectric film is preferred to be a capacitor paper exemplified by kraft paper. This paper can either be coated in order to minimize metal spearing into the interior region of the paper or it may be uncoated followed by conventional clearing techniques. In the case of coated paper, any known prior art coating material, such as cellulose acetate, can be employed. Numerous other porous dielectric spacers can be used including linen paper, both calendered and supercalendered, fiber glass woven and pulped in the form of a cloth or a mat like spacer, cross linked nylon of both the woven and nonwoven variety and other porous dielectric spacers and combinations of these above spacers. In the event that the capacitor is not to be impregnated with a dielectric fluid, the comparatively nonmeltable dielectric film need not be of a porous nature.

The comparatively meltable dielectric film is typified by polypropylene but in general can be any other polyolefin or copolymer. The important distinction between the two dielectric films employed in the capacitors of this invention, are that the film carrying the metallization layers be comparatively nonmeltable at temperatures which normally would melt the comparatively meltable dielectric film. By employing this combination of films one of the principal objects of the invention is achieved by providing a structure which permits the use of dielectric films which have excellent electrical characteristics but which have the drawback of being extremely sensitive to heat and thus are subject to dimensional changes which hinder the making of effective electrical contact. The objects of the present invention would not be achieved by employing an extremely high melting dielectric film in place of the comparatively meltable film herein.

In order to further aid in the impregnation of the capacitors of the present invention with a dielectric fluid the comparatively meltable film can have the surface thereof roughened, embossed, striated, etc., in order to provide additional impregnation paths into the interior of the capacitor.

The metallization layers can be applied by metal spraying, evaporation, sputtering or any other established technique employing any desired metal, preferably zinc or aluminum.

It is essential that the comparatively metlable film be no wider than the film carrying the metallization layers and it is preferred that this film be slightly narrower than the comparatively nonmeltable film. This limitation will insure that the comparatively meltable film will not interfere with the contact of the end contact metal to the oppositely poled electrodes.

When the capacitor unit is not to be impregnated with a dielectric fluid, Mylar or Kapton are good examples of substitutes for kraft paper. Specific examples of such comparatively nonmeltable films are films of: polyethyleneterephthalate, the polymeric reaction product of benzophenone tetracarboxylic dianhydride and metaphenylenediamine, and poly[4,4-isopropylidene diphenolcarbonate]. In addition to mineral oil any other conventional dielectric impregnants can be employed in the present invention, for example mineral wax, castor oil, dielectric resins, halogenated aromatic compounds, etc.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed is:

1. A convolutely wound capacitor comprising in combination, a comparatively nonmeltable dielectric film having a metallization layer in extended electrode fashion on opposite surfaces thereof, so as to leave an unmetallized margin also on opposite surfaces thereof; at least one comparatively meltable dielectric film positioned against at least one metallization layer, said comparatively meltable film being of a width ranging from slightly narrower than said comparatively nonmeltable film to at least greater than the width of the metallization layer which it contacts; said films being convolutely wound so that they have a common longitudinal center line and so that said comparatively meltable film will separate oppositely poled electrodes; applied-while-molten metal terminals in contact with at least part of the extended region of each metallization layer; said comparatively nonmeltable dielectric being nonmeltable at temperatures which melt said meltable dielectric.

2. The capacitor of claim 1 wherein said comparatively nonmeltable film is nonporous.

3. The capacitor of claim 1 wherein said comparatively nonmeltable film is porous.

4. The capacitor of claim 3 wherein said porous film is paper.

5. The capacitor of claim 3 including a dielectric impregnant which is at least fluid during impregnation.

6. The capacitor of claim 5 wherein said porous film is paper and said comparatively meltable film is a polyolefin.

7. The capacitor of claim 5 wherein said polyolefin is polypropylene.

8. The capacitor of claim 2 wherein said comparatively meltable film is a polyolefin and said nonporous film is an organic polymer.

9. The capacitor of claim 4 wherein said comparatively meltable film is a polyolefin.

10. The capacitor of claim 9 wherein said polyolefin is polypropylene.

References Cited

UNITED STATES PATENTS 3,093,775    6/1963    Lamphier _____ 317—260

(Other references on following page)

UNITED STATES PATENTS

| | | | |
|---|---|---|---|
| 3,214,657 | 10/1965 | Davis | 317—260X |
| 3,419,770 | 12/1968 | Tomago | 317—258 |
| 3,447,048 | 4/1969 | Wurster | 317—258 |
| 3,457,478 | 7/1969 | Lehrer | 317—260 |

OTHER REFERENCES

Birks, J. B., Modern Dielectric Materials, Heywood & Co., London, 1960, p. 141.

Brady, Materials Handbook, 9th ed., McGraw-Hill, N.Y., 1963, p. 607.

ELLIOT A. GOLDBERG, Primary Examiner

U.S. Cl. X.R.

317—260

UNITED STATES PATENT OFFICE
CERTIFICATE OF CORRECTION

Patent No. 3,553,543        Dated January 5, 1971

Inventor(s) Paul H. Netherwood

It is certified that error appears in the above-identified patent and that said Letters Patent are hereby corrected as shown below:

Column 1, line 54, "shortening" should be -- shorti
    Column 4, line 20, "poly[4,4-isopropylidene"
           should be -- poly[4,4'-isopropylidene --
    Column 4, line 62, (Claim 7), "5" should be -- 6 --

Signed and sealed this 23rd day of March 1971.

(SEAL)
Attest:

EDWARD M. FLETCHER, JR.
Attesting Officer

WILLIAM E. SCHUYLER, JR
Commissioner of Patents